Patented Dec. 8, 1953

2,662,062

UNITED STATES PATENT OFFICE 2,662,062

RESOLVING EMULSIONS

Simpson D. Sumerford, Baton Rouge, La., assignor to Standard Oil Development Company, a corporation of Delaware No Drawing. Application August 26, 1950, Serial No. 181,693

6 Claims. (Cl. 252—328)

This invention relates to the removal of water-soluble impurities from petroleum, topped petroleum oils, crude fractions obtained by distillation, etc.

Feed stocks to catalytic cracking operations are ordinarily contaminated with water soluble salts of iron, sodium, nickel, aluminum, vanadium, silicon, calcium, chromium and others. It is vitally necessary to remove these salts, otherwise they serve to markedly reduce the activity of the catalyst used in the cracking process. It is customary to remove these salts from the oil by washing with water. One of the important difficulties in reducing this salt content by water-washing is that of separating the oil and water phases. Efficient contacting generally results in emulsions of oil-in-water or water-in-oil depending on such variables as the ratio of oil to water, the presence of material or intentionally added emulsifying agents, temperature, etc. These emulsions are usually very stable and difficult to resolve.

It has now been found that the oil and water phases may be more completely separated and the amount of ash reduction significantly increased by the use of two streams of water, having a pH differential, for the water washing. This differential should be at least 3, preferably 5 or greater. Furthermore, the pH of one stream of water should be above 7 and the other below 7. The same results may be accomplished by mixing two emulsions having a similar pH differential. The invention essentially consists in washing a hydrocarbon fraction, containing the soluble salts, with water in the usual manner and then passing the mixture of oil and water into a column of water or water-oil emulsion having a pH different from that of the oil and water mixture, either above or below pH 7, depending on whether the pH of the oil-water mixture is below or above pH 7.

The amount of water added to the oil may vary between 20 and 40% based on the oil.

The following examples illustrate the beneficial results to be obtained in accordance with the present invention:

Example 1

A reduced crude feed to catalytic cracking containing 160 lbs. of total ash per 1000 barrels of oil (ptb total ash) was mixed with water having a pH below 7 and then pumped through a 0.20 glass jet into a column of water having a pH above 7 in one case and with water having the same pH in another case.

The following results were obtained:

| Run No. | pH of pump water | pH of column water | Vol. percent oil recovered | ptb in washed oil | Weight percent ash removal |
|---|---|---|---|---|---|
| 1 | 6.7 | 6.7 | 89 | 18.5 | 83 |
| 2 | 0.2 | 11.6 | 89 | 13.3 | 92 |

The above data show that the use of stream of water having a pH below 7 and one above 7 increases the amount of ash removed. This improvement is due to the better separation of water from oil obtained in run 2.

Example 2

Another reduced crude containing 100 parts of ash per 1000 bbls. of oil was mixed with water as in Example 1 and the mixture introduced into a column of water having a pH different from the water pumped in in one case and the same in another. The following results were obtained:

| Run No. | Jet velocity, ft./sec. | pH of pump $H_2O$ | pH of column $H_2O$ | ptb in washed oil | Weight percent ash removal |
|---|---|---|---|---|---|
| 3 | 50 | 3.3 | 8 | 9 | 91 |
| 4 | 70 | 8 | 8 | 12.5 | 87.5 |

The above data show that despite the more favorable mixing velocity used in run 4, poorer ash removal was obtained than was the case when two streams of different pH were used. A comparison of runs 1 and 4 show that the actual pH of the mixture is immaterial, since that of run 1 was below 7 and that of run 4 was above.

The nature and objects of the present invention having thus been set forth and illustrative embodiments of the same given, what is claimed as new and useful and desired to be secured by Letters Patent is:

1. A process for desalting petroleum oils which comprises mixing the oil with a first body of water having a pH different from 7, passing the oil and water mixture into a second body of water having a pH adapted to neutralize the said first body of water and thereafter separating and removing the water fraction from the oil.

2. A process according to claim 1 in which the pH of the first body of water differs from the pH of the second body of water by at least 3 pH units.

3. A process according to claim 1 in which the pH of the first body of water differs from the pH of the second body of water by at least 5 pH units.

4. A process for desalting a petroleum feed stock to a catalytic cracking operation which comprises mixing and emulsifying the feed stock with a first body of water having a volume about 20% to 40% of the volume of the feed stock and having a pH different from 7, passing the resulting mixture and emulsion into a second body of water having a pH greater than 7 when the first body of water has a pH less than 7, and having a pH less than 7 when the first body of water has a pH greater than 7, thereafter separating and removing the water fraction from the feed stock.

5. Process according to claim 4 in which the first body of water has a pH less than 7 and the second body of water has a pH greater than 7.

6. Process according to claim 4 in which the pH of the first body of water differs from the pH of the second body of water by at least 5 pH units.

SIMPSON D. SUMERFORD.

References Cited in the file of this patent

UNITED STATES PATENTS

| Number | Name | Date |
|---|---|---|
| 2,539,478 | Roberson | Jan. 30, 1951 |